US005395880A

United States Patent [19]

Sato et al.

[11] Patent Number: 5,395,880

[45] Date of Patent: Mar. 7, 1995

[54] MANUFACTURING METHOD OF RESIN GRANULES

[75] Inventors: Haruhiko Sato, Kyoto; Naoya Yabuuchi, Osaka; Shinji Seo, Hyogo; Takehiro Ojima, Osaka, all of Japan

[73] Assignee: Nippon Paint Co., Ltd., Osaka, Japan

[21] Appl. No.: 967,740

[22] Filed: Oct. 28, 1992

[30] Foreign Application Priority Data

Oct. 29, 1991 [JP] Japan ................................ 3-282873

[51] Int. Cl.$^{6}$ ........................ C08L 29/04; C08F 2/20; C08F 2/24; C08F 1/00

[52] U.S. Cl. ...................................... 525/59; 525/244; 525/253; 526/200; 526/202; 524/459; 524/503

[58] Field of Search ..................... 525/59, 57, 58, 253, 525/123; 524/459, 503, 35; 526/200, 202; 523/335

[56] References Cited

U.S. PATENT DOCUMENTS

| | | | |
|---|---|---|---|
| 4,077,804 | 3/1978 | Uanzo | 524/459 |
| 4,128,514 | 12/1978 | Fitzgerald | 524/459 |
| 4,226,966 | 10/1980 | Shiraishi et al. | 526/202 |
| 4,388,442 | 6/1983 | Taniguchi et al. | 525/60 |
| 4,652,511 | 3/1987 | Ueda et al. | 525/253 |
| 4,935,469 | 1/1990 | Akasaki et al. | 525/253 |
| 5,043,404 | 8/1991 | Mahabadi et al. | 526/194 |
| 5,089,570 | 2/1992 | Rauterkus et al. | 526/202 |
| 5,096,988 | 3/1992 | Amano et al. | 526/200 |

FOREIGN PATENT DOCUMENTS

| | | | |
|---|---|---|---|
| 199859 | 11/1986 | European Pat. Off. . | |
| 354466 | 2/1990 | European Pat. Off. . | |
| 357376 | 3/1990 | European Pat. Off. . | |
| 61-215603 | 3/1985 | Japan | 525/57 |

OTHER PUBLICATIONS

Encyclopedia of Polymer Science and Engineering, John Wiley and Sons, vol. 3, pp. 235–269.

Encyclopedia of Polymer Science and Engineering, John Wiley and Sons, vol. 17, pp. 167–198.

*Primary Examiner*—James J. Seidleck
*Assistant Examiner*—M. L. Warzel
*Attorney, Agent, or Firm*—Wenderoth, Lind & Ponack

[57] ABSTRACT

The present invention provides a method which makes it possible to manufacture substantially spherical resin granules with a narrow grain size distribution by a simple operation. According to the present invention, there is provided a method of manufacturing resin granules with a grain diameter of $1 \sim 100$ $\mu m$ and narrow grain size distribution by controlling the cloud point of polyvinyl alcohol and other water soluble polymers.

8 Claims, 2 Drawing Sheets

MANUFACTURING METHOD OF RESIN GRANULES

FIELD OF INVENTION

The present invention relates to a method of manufacturing resin granules with a narrow distribution of grain diameter and, in particular, a method of manufacturing granules useful as a toner for electrostatic recording and a carrier for the diagnostic agent.

BACKGROUND OF THE INVENTION

Various efforts have been made to develop a method of manufacturing micron-size resin granules with a narrow distribution of grain size and many patents have been filed therefor.

One of such methods is the so-called suspension-polymerization method wherein liquid drops of a vinyl monomer are formed in water in the presence of an appropriate dispersion stabilizer and polymer granules are synthesized using appropriate oil-soluble polymerization initiators.

However, when polymerization is conducted under the ordinary agitating conditions, the polymer sticks to the wall of the reaction vessel, agitating fan, etc. and, when polymer granules are produced, the distribution of grain diameter is mostly governed by the probability factor of the division and joining of liquid drops during polymerization. As a result, only those resins having an extremely wide grain size distribution are obtained. As a countermeasure therefor, there has been proposed a method wherein polymerization conditions are so modified that, for example, the monomer once goes through bulk polymerization or a part of the polymer is dissolved in the monomer and after thus providing some viscosity, suspension polymerization is conducted. Alternatively, polymerization is carried out by using various suspension stabilizers having strong surface activity, or inorganic powder which is difficult to dissolve in water, or combinations of such materials, but the improvement of grain size distribution realized by such methods has been only slight.

On the other hand, according to the seed polymerization swelling method described in Japanese Kokai Publication 58-106554, it is possible to form vinyl polymer granules of extremely narrow grain size distribution and it is also possible to bridge and gelate the monomer using polyfunctional monomers such as divinyl benzene.

However, according to this method, the growth of the grains occurs in multi-stages and therefore the steps are extremely long; thus, its industrialization potential is poor. Besides, it is difficult to uniformly charge foreign matters such as pigments in the granules by such method.

In order to improve such drawbacks, for example, Japanese Kokai Publication 3-200976 proposes a method of forming colored polymer granules by dispersion polymerization in non-aqueous (or solvent/water mixture) solvents. However, since the method uses solvents, problems occur as to the waste liquid treatment and in respect to safety.

SUMMARY OF THE INVENTION

The present invention solves the aforesaid conventional problems and its objective is to provide a method which makes it possible to manufacture, by a simple and convenient process, substantially spherical resin granules with a narrow grain size distribution.

The present invention thus provides a method of manufacturing resin granules with a grain diameter of $1 \sim 100$ μm and of a narrow grain size distribution, comprising mixing the following three components:

(a) either a polyvinyl alcohol with a cloud point at 30° ~ 90° C. obtained by the addition of an electrolytic salt to an aqueous solution of a polyvinyl alcohol with a saponification degree of more than 85% or a polyvinyl alcohol with a saponification degree of 60 ~ 85%, or both, (b) an aqueous solution containing at least one kind of water soluble polymer selected from the group consisting of methyl cellulose, hydroxypropyl cellulose, a polyethylene glycol alkyl ether and a block copolymer of polyethylene glycol-polypropylene glycol, and (c) a granule forming component containing a polymerizing monomer, at temperatures below the cloud point of polyvinyl alcohol and water-soluble polymer, thus obtaining fine primary granules of less than 10 μm, heating such primary granules to a temperature above said cloud point to obtain, by agglomeration and unification of such granules, substantially spherical granules with a grain diameter increased to about 2 ~ 20 times. The monomers are polymerized during heating or after formation of the granules.

The present invention also provides a method of manufacturing resin granules with a grain diameter of 1 to 100 μm and having a narrow grain size distribution, comprising mixing the following two components:

(a) either a polyvinyl alcohol with a cloud point at 30° to 90° C. obtained by the addition of an electrolytic salt to the aqueous solution of polyvinyl alcohol with a saponification degree of more than 85%, or a polyvinyl alcohol with a saponification degree of 60 to 85%, or both, and (c) a granule forming component containing a polymerizing monomer, at temperatures below the cloud point of the polyvinyl alcohol and water-soluble polymer mentioned hereinafter, thus obtaining fine primary granules of less than 10 μm, and admixing with (b) an aqueous solution containing at least one kind of a water soluble polymer selected from the group consisting of methyl cellulose, hydroxypropyl cellulose, a polyethylene glycol alkyl ether and a block copolymer of polyethylene glycol-polypropylene glycol, at temperatures below the cloud point, heating such primary granules to a temperature above said cloud point to obtain, by agglomeration and unification of such granules, substantially spherical granules with a grain diameter increased to about 2 to 20 times, and then polymerizing the monomers during heating or after formation of granules.

DETAILED DESCRIPTION OF THE INVENTION

Figure 1:
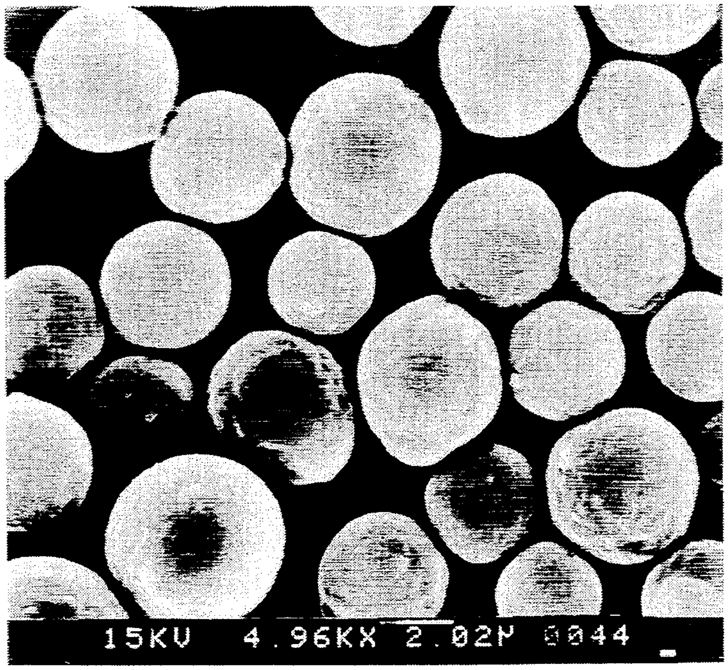
FIG. 1 shows toner granules with a grain diameter of 5.2 μm and a variation coefficient of 17.5%, according to example 7.

The polyvinyl alcohol having a cloud point in the range of 30°~90° C. used in the present invention is one having been given such cloud point by the addition of an electrolytic salt to polyvinyl alcohol with a saponification degree of more than 85% or a polyvinyl alcohol with a saponification degree of 60 to 85%.

The water soluble polymer having a cloud point in the range of 30°~90° C. used in the present invention is selected from the group comprising cellulose derivatives, such a methyl cellulose hydroxypropyl cellulose, a polyethylene glycol alkyl ether and a block copolymer of a polyethylene glycol-polypropylene glycol.

The polymerizable monomer usable for the grain forming components of the present invention may be a monomer with an ethylenic unsaturated double bond or a compound which can effect an interfacial polymerization reaction. The monomer with an ethylenic unsaturated double bond may be a styrene-based monomer or an acrylic acid ester-based monomer. The styrene-based monomer may be styrene, vinyl toluene, ethyl styrene, p-chlorostyrene, etc. The acrylic ester monomer may be ethyl acrylate, ethyl methacrylate, n-butyl acrylate, n-butyl methacrylate, methyl acrylate, methyl methacrylate, 2-ethylhexylacrylate, 2-ethylhexyl methacrylate, etc. These monomers may be used independently or in a mixture and when necessary, they may be co-used with N,N'-dimethylaminoethyl methacrylate, N,-N'-diethylaminoethyl methacrylate or a cationic monomer such as vinyl pyridine or an anionic monomer such as an unsaturated fatty acid and an unsaturated fatty acid anhydride such as acrylic acid, methacrylic acid, maleic acid, fumaric acid and maleic acid anhydride. Further, a polyfunctional monomer may be used, such as divinyl benzene, ethylene glycol dimethacrylate, trimethylol propane triacrylate, glycidyl metacrylate, glycidyl acrylate, etc.

The compounds which can effect the interfacial polymerization reaction are organic-soluble compounds with more than two groups available for chemical reaction per molecule and can form a polymer layer at the outer shell of the granule by reacting with a water-soluble monomer having more than two functional groups. Examples of such diisocyanate compounds are diisocyanate, hexamethylene diisocyanate, 4, 4'-dicyclohexylmethane diisocyanate, m-tetramethylxylene diisocyanate (m-TMXDI), trimethylhexamethylene diisocyanate (TMDI), hexane diisocyanate, a diisocyanate prepolymer which is a polyether-type liquid urethane prepolymer etc., sebacic chloride, terephthalic chloride, isophthalic chloride, azelaic chloride, adipic chloride, etc.

According to the present invention, after preparing the primary granules of granule-forming components at a temperature below the cloud point of the water-soluble polymer, the obtained suspension liquid is heated to a temperature above the cloud point of the water-soluble polymer and thus oil drops contained in the suspension liquid are agglomerated and unified. Therefore, when the polymerizable monomer contained in the granule-forming component has an ethylenic unsaturated double bond, it is possible to conduct a polymerization reaction simultaneously in the agglomeration-unification step by adding a radical polymerization initiator. The polymerization initiator to be added may be a generally used oil-soluble peroxide-type or an azo-type initiator. For instance, it may be benzoyl peroxide, lauroyl peroxide, 2,2'-azobisisobutyronitrile, 2,2'-azobis-(2,4-dimethylvaleronitrile), etc. The amount of such initiator used is 0.1~10 wt %, preferably 0.5~5 wt % of the amount of polymerizable monomer.

When the polymerizable monomer is a compound which can effect an interfacial polymerization reaction, it is possible to form a polymer layer at the outer shell of the granule by reducing the temperature of the suspension liquid to a level below the cloud point of the water soluble polymer in the agglomeration-unification step, or after the agglomeration-unification step, and then adding a water-soluble compound which can effect the interfacial polymerization reaction. The water-soluble compound which can effect the interfacial polymerization reaction may be 1,6-hexane diamine, 1,4-bis(3-aminopropyl) piperazine, 2-methylpiperazine, m-xylene-α, α'-diamine, etc.

The granule forming component of the present invention may contain resin components other than a polymerizable monomer. Such resin components other than the polymerizable monomer are not specifically limited, but may be selected from resins well-known in the industry according to the characteristics required of the granules obtained. Examples of such resin may be a polyester resin, a polycarbonate resin, a polyurethane resin, a (meth) acrylic acid ester copolymer, a vinyl aromatic compound copolymer such as styrene, polyethylene wax, polypropylene wax, silicone oil and resin compositions containing said compounds.

For the purpose of dissolving the resin component and reduction of viscosity etc., such solvent as xylene, toluene, cyclohexane, ethyl acetate maybe co-used with the resin component.

The amount of the solvent is preferably less than 200 wt parts, more preferably less than 80 wt parts as against 100 wt parts of the granule forming component. When the amount of use of the solvent exceeds 200 wt parts, the cost of removal of solvent increases and it is undesirable.

When the granules obtained by the method of the present invention are used for the recording material such as toner, a coloring material such as a dyestuff or pigment is added to the granule forming component. Such coloring material may be for instance, an organic pigment such as copper phthalocyanine, Quinacridone or diazo-yellow, carbon black, magnetic powder etc.

The amount of coloring material is preferable 0.5~150 wt parts as against 100 wt parts of the granule forming component. When the content of the coloring material is less than 0.5 wt parts, its coloring power is inferior and when the content is over 150 wt parts, the dispersibility of coloring material decreases.

When the granules obtained are used as a toner, it is preferred to use a static charge controlling agent such as a boron complex, a metal complex dye or a quaternary ammonium salt together with said coloring material. The amount of the static charge controlling agent is preferably 0.1~5 wt parts as against 100 wt parts of the granule forming component. When the amount is less than 0.1 wt part, the static charge controlling effect is insufficient and when it is over 5 wt parts, the static charge disperses.

According to the present invention, the suspension liquid is obtained by mixing the aforesaid granule forming component and water solution of polyvinyl alcohol having said cloud point and the water-soluble polymer. The amount of said polyvinyl alcohol and water-soluble polymer against the amount of granule forming component may be properly adjusted for the content of the granule forming component and the objective grain diameter. From the viewpoint of blendability and grain size control, the concentration of the aqueous solution containing polyvinyl alcohol and water soluble polymer is preferred to be 0.02～15 wt % and the mixing ratio of the granule forming component and the water solution of water soluble polymer is preferably 1/0.5～$\frac{1}{3}$.

When the viscosity of the granule forming component and aqueous solution of water-soluble polymer is relatively low, an agitator utilizing high speed shearing, such as a homogenizer, may be used for mixing. When the viscosity of the granule forming component and water-soluble polymer is high, a mixer, such as multipurpose mixer, or planetary mixer, may be used.

Said polyvinyl alcohol, having a cloud point at 30°～90° C., may be a partially saponified polyvinyl alcohol with a saponification degree of 60～85%, preferably 70～80%. It is possible to provide a cloud point to the polyvinyl alcohol with a saponification degree of over 85% which does not by itself have such a cloud point, by the addition of an electrolytic salt thereto. An electrolytic salt, such as NaCl, $Na_2SO_4$, and $Na_2HPO4$, may be used as the sedimentation agent for the polyvinyl alcohol and such cloud point may be properly adjusted by the amount of this addition.

The water soluble polymer having a cloud point at 30°～90° C. may be a cellulose derivative, such as methyl cellulose, hydroxypropyl cellulose, a polyethylene glycol alkylether or a block copolymer of a polyethylene glycol-polypropylene glycol and combinations thereof, which have a relatively high solubility in organic solvents, when compared to polyvinyl alcohol.

The weight ratio of the polyvinyl alcohol and other water soluble polymer in said aqueous solution of water soluble polymer is preferably in the range of 99.5/0.5～10/90. When the ratio of the water soluble polymer, other than the polyvinyl alcohol, is less than 0.5., the shape of the granules obtained are not uniform and distribution of grain diameter also tends to be wide. When the ratio of water soluble polymer, other than polyvinyl alcohol, exceeds 90, the stability of the suspended granules at temperatures above the cloud point decreases, and large, coarse granules and agglomerating lumps tend to generate.

The said aqueous solution of the polyvinyl alcohol and said water solution of water-soluble polymer may be used simultaneously when they are mixed with the granule forming component or alternatively, said water-solution of the water-soluble polymer may be added after mixing said water solution of polyvinyl alcohol and granule forming component. However, depending on the molecular weight of polyvinyl alcohol of the kind of said water-soluble polymer, there may exist a critical concentration in which segregation occurs and they may not be soluble with each other, thereby causing difficulty in the mixing operation. Therefore, it is preferred to add the water solution of said water-soluble polymer after mixing said water solution of polyvinyl alcohol and granule forming component.

The cloud point of the aqueous solution of polymer to be set as aforesaid is preferably in the range of 30°～90° C., particularly in the range of 40°～80° C. When the cloud point of the water-soluble polymer is less than 30° C., temperature control in the step of adjustment of the primary granules becomes difficult. On the other hand, when the cloud point is set above 90° C. and the polymerizable monomer is composed of the double bond of ethylene, the polymerization reaction proceeds prior to the agglomeration/unification, the viscosity of granule forming component increases, and the agglomerating potency decreases, resulting in a wider distribution of the grain diameters. When the polymerizable monomer is an isocyanate, it causes a vigorous exothermic reaction with water and it is undesirable from a safety viewpoint.

In order to increase the safety at a temperature above the cloud point of the suspended substance formed as aforesaid, a water-soluble polymer which does not show a cloud point, such as hydroxyethyl cellulose or polyvinyl alcohol with a saponification degree of over 86%, may be added to the suspension liquid.

The thus obtained suspension liquid may be diluted by ion exchange water to adjust the ultimate content of the oily substance so it is 10～40 wt %. At a content of less than 10 wt%, it becomes economically expensive and at a content above 40 wt, the distribution of grain diameter widens.

Next the diluted suspension liquid is heated to the agglomeration temperature, which is above the cloud point of the aqueous solution of polymer, the temperature rising speed being adjusted to 0.4°～2.0° C./min. Such agglomeration temperature depends on the kind of granule forming component and the aqueous solution of the polymer. The agglomeration temperature is set in such a way that the time required for the oil drops contained in the suspension liquid be formed into the desired grain diameter falls in the range of 5～75 min.

When it is below 5 minutes, the fine particles remain unagglomerated and thus the grain diameter distribution widens. When it exceeds 75 minutes, large coarse granules tend to be produced.

Normally when the temperature of the suspension liquid increases, the grain diameter of the oil drops increases with time. Therefore, in order to adjust it to the desired diameter, it is necessary to increase the viscoelasticity of the oil drops by completing the reaction of polymerizing monomer and to stop the increase of grain size or when the oil drop is formed to the desired grain size, the suspension liquid is cooled to a temperature below the cloud point of the water soluble polymer to thus stop the growth of oil drops.

The grain diameter of the enlarged secondary granule is preferred to be 2～20 times of the diameter of the primary granule. When it is less than twice, grain diameter distribution widens and when it is over 20 times, agglomerated lumps tend to be produced in the system.

By adjusting the grain diameter of the oil drops contained in the suspension liquid utilizing the cloud point of more than two kinds of water soluble polymers, it is possible to obtain a suspension containing the oil drops with a remarkably uniform grain diameter when compared to the conventional type suspension. The mechanism of such agglomeration-unification is not clear, but it is estimated that polyvinyl alcohol and other water soluble polymers, which exist as the stabilizer of the oil drops of the granule forming component at the temperature below the cloud point, become insoluble in water at the temperature above the cloud point, which causes agglomeration of oil drops in the granule forming component. Then, the water soluble polymers, other than polyvinyl alcohol, existing at the surface of agglomerating oil drops, which have relatively high solubility into granule forming components, such as a polymerizable monomer, work on the unification of oil drops and thus substantially spherical secondary granules are obtained.

To be substantially spherical as aforesaid means that the practical Waadel sphericity is in the range of 0.95~1.00. Here Waadel's practical sphericity is the value represented by the ratio of the diameter of the circle having the area equivalent to the projected area of the granule and the diameter of the minimum circle circumscribing the projected image of the granule.

After the completion of the reaction of polymerizable monomer contained in the granule forming component, the formed resin granules are separated and dried by the well-known methods, such as filtration or centrifuge. Thus, the spherical resin granules with a variation coefficient of less than 30% are obtained.

The thus obtained resin granules have such advantageous features, in addition to the said uniformity of shape and grain diameter, that the melting temperature control, the pigment dispersibility control, the grain structure control (microcapsulation, etc.) and the surface modification (to provide functional group to the surface of granules) are facilitated.

When granule forming components contain coloring agents, such as carbon black and, upon necessity, polyester resin, vinyl polymer resin and additives such as polypropylene wax, etc., the toner for development of electrostatic image made therefrom has a spherical granular shape and narrow grain diameter distribution. The thus obtained toner already has the specified grain diameter distribution and it does not require a sorting out process employed for toners in general, and further, since the granules are spherical, even when they are fine powder of less than 10 μm in diameter, they have such advantageous characteristics as excellent flowability, developing characteristics, transcription characteristics and electrostatic characteristics.

When the substance which can effect interfacial polymerization reaction is used as a polymerizable monomer, it is possible to form microcapsule-type granules and even when the substance which melts at such low temperature as 90° C.~110° C. is used for the granule forming component, it is possible to obtain granules having superior storage stability.

Furthermore, by leaving functional groups, such as isocyanate groups, amino groups, carboxylic groups, glycidyl groups, ethylenic unsaturated bonds, etc. at the surface of granules and making the granules react therewith, it is possible to modify the surface of the granules with different kinds of substances.

EXAMPLES

The present invention, will be explained below concretely on the basis of the Examples, but the present invention is not at all to be limited to these examples.

EXAMPLE 1

400 g of styrene-n-butyl metacrylate resin (Hymer-SBM-73F manufactured by Sanyo Kasei Kogyo Co.) was dissolved in a polymerizable monomer obtained by mixing 420 g of styrene monomer, 175 g of n-butyl acrylate and 5 g of ethylene glycol dimethacrylate, followed by addition of 30 g of 2,2'-azobisisobutyronitrile and thus the granule forming component was prepared.

Subsequently a polymer solution comprising 35 g of Metolose 65 SH (methyl cellulose manufactured by Shin-Etsu Chemical Co.), 60 g of Gohsenol GH-20 (polyvinyl alcohol with a saponification degree of 88% manufactured by Nippon Synthetic Chemical Industry Co.), 15 g Gohsenol KL-05 (polyvinyl alcohol with a saponification degree of 80% manufactured by Nippon Synthetic Chemical Industry Co.) and 1350 g of ion exchanged water was added to said granule forming component. The thus obtained mixture was mixed by a homogenizer at a rotation frequency of $10^4$ rpm and thus the suspension containing oil drops with grain size of about 1.5 μwere prepared.

The thus obtained suspension was diluted by the addition of 1500 g of ion exchanged water and it was transferred to the reaction vessel provided with an agitation device, a temperature regulator and a reflux tube. The suspension was then heated to 80° C. at the speed of 1° C./min. and by holding it at this temperature for 6 hrs. The polymerizable monomer was reacted. Thereafter, the reaction product was cooled, centrifuged for separation of solid and liquid and dried.

When the grain diameter of thus obtained resin granules was measured by a Coulter counter, the average grain diameter was 5.3 μm, the variation coefficient was 15.0% and the grain size distribution was extremely sharp.

EXAMPLE 2

An aqueous solution of polyvinyl alcohol with a cloud point of about 55° C. was obtained by adding 50 g of $Na_2SO_4$ to the aqueous solution of polymer comprising 75 g of Gohsenol GH-20 and 900 g of ion exchange water.

The thus obtained polyvinyl alcohol solution was added to the granule forming component of Example 1 and they were mixed by the same method as in Example 1 and the suspension containing oil drops of about 1.8 μin grain diameter was prepared.

Then a polymer solution composed of 25 g of hydroxypropyl cellulose (HPC-L manufactured by Nippon Soda Co.) and 2000 g of ion exchange water was added to thus obtained suspension and after such dilution, reaction was conducted in the same manner as in Example 1.

The grain diameter of thus obtained resin granules was 6.8 μm, the variation coefficient was 13.5%, and the grain size distribution was extremely sharp.

EXAMPLE 3

A mixture of trimethyrol propane, neopentyl glycol, hexahydrophthalic acid anhydride, isophthalic acid, E-caprolactone, with an average molecular weight of 1300, a hydroxyl group value of 210 mg KOH/g, 100 g of Quinacridone Red, 16.0 g of a negative charge controlling agent VP-434 (manufactured by Hoechst A.G.) were mixed to prepare the resin component. The thus obtained resin component was added with the mixture of 420 g of tetramethyl xylene diisocyanate (TMXDI manufactured by Takeda Chemical Industries Ltd.) and 80 g of isophorone diisocyanate to obtain the granule forming component.

Subsequently, an aqueous solution of a polymer composed of 75 g of hydroxypropyl cellulose, 60 g of Gohsenol GH-20, 150 g of KL-05 and 1350 g of ion exchange water was added to said granule forming component. The thus obtained mixture was mixed by a homogenizer at a rotation frequency of $10^4$ rpm, thus forming suspension containing oil drops of about 1.3 μm in grain diameter. The thus obtained suspension was diluted by gradually adding 1500 g of ion exchange water and it was transferred to the reaction vessel provided with an agitating device, temperature controller and reflux tube. The reaction vessel was heated to 65° C. at a speed of 1° C./min. and after holding it at 65° C. for 15 min. it was water-cooled to 25° C.

Subsequently, 1080 g of 20% aqueous solution of hexamethylene diamine was added dropwise over 45 minutes. After this addition, it was left standing for 10 min. and 75 g of n-butylamine was further added dropwise, over a period of 10 minutes. Thereafter, the temperature of the reaction mixture was set at 45° C. and xylene, used as solvent, was removed by blowing air. The thus obtained residue was centrifuged to separate the solid and liquid and after drying, it was crushed to obtain the toner granules. When the grain diameter of thus obtained toner was measured by a Coulter counter, the average grain diameter was 6.2 μm, the variation coefficient was 18.0% and a toner of Magenta color with an extremely sharp grain size distribution was obtained. After mixing 0.6 g of silica granules (AEROSIL R972 manufactured by Nippon Aerosil Co.) as a fluidizing agent with 100 g of the thus obtained toner, the mixture was further mixed with a silicon coated ferrite carrier and the copied image was evaluated by a U-Bix 3142 (copying machined manufactured by Konica Co.), a clear image with no fog was obtained.

EXAMPLE 4

Copper phthalocyanine is used instead of Quinacridone Red and a mixture of 68 mol % of hexamethylene diamine and 32 mol % of diphamine D-230 (long chain diamine, molecular weight 230) was used instead of hexamethylene diamine and other than that, the process was conducted in the same way as Example 3 to obtain a cyanide colored toner. The grain diameter of the thus obtained toner was 5.7 μm, and the variation coefficient was 15.5%. When the thermal characteristics of the thus obtained toner were measured by using a flow tester (manufactured by Shimadzu Seisakusho K.K.), the temperature at which flow-out begins was 106° C. When such toner was left standing for 7 days at 55° C., the powder characteristics have undergone no change, indicating an excellent storage stability.

EXAMPLE 5

A mixed solution of 500 g of polyurethane resin (average molecular weight 1150, 50% xylene solution) comprising hexamethylene diisocyanate, toluene diisocyanate, 2-methyl-1,3 propane diol and 500 g of Takenate D-17OHN (manufactured by Takeda Chemical Industries Ltd.) was used as a granule forming component and in the same manner as in Example 3, non-soluble gel granules with an average grain diameter of 5.5 μm, a variation coefficient of 14.5%, which did not melt at up to 300° C. were obtained. Such granules are useful as an additive for rheology control.

EXAMPLE 6

Aminopyrene is used instead of n-butylamine but otherwise, the process was conducted in the same manner as in, Example 5 and fluorescent granules were obtained. The thus obtained granules were gel granules with an average grain diameter of 5.4 μm and a variation coefficient of 14.5%.

EXAMPLE 7

The composition shown below was mixed and it was dispersed by a sand grinder mill, and thus a granule forming component, wherein carbon black and polypropylene were favorably dispersed, was prepared.

| Components | Amount of mixing (g) |
|---|---|
| Styrene-n-butyl methacrylate resin (Hymer SBM-73F) | 400 |
| Styrene monomer | 420 |
| n-Butyl acrylate | 175 |
| Ethylene glycol dimethacrylate | 5 |
| Carbon black Printex 150T (manufactured by Degussa AG) | 80 |
| Electric charge controlling agent | |
| Spiron Black TRH (manufactured by Hodogaya Chemical Co.) | 10 |
| *Polypropylene grafted resin obtained in Example 1 of Tokukaihei 1-201676 | 180 |
| 2,2'-azobisisobutyronitrile | 30 |

An aqueous solution of a polymer was obtained by mixing the following composition with the above.

| Components | Amount of mixing (g) |
|---|---|
| Gohsenol GH-20 | 75 |
| Gohsenol KL-05 | 75 |
| Hydroxypropyl cellulose | 15 |
| Ion exchange water | 1350 |

The mixture of the thus obtained granule forming component and aqueous solution of polymer were mixed by a planetary mixer to obtain the suspension containing oil drops with an average grain size of 2.6 μm. The thus obtained suspension was diluted by 3000 g of ion exchange water and it was transferred to the reaction vessel provided with agitation equipment, temperature controller and reflux tube. Such suspension was heated to 80° C. at a speed of 1° C./min and by holding it for 6 hrs. at such temperature, the product was separated, dried and crushed in the same manner as in Example 1 and the black toner granules were obtained.

Figure 2:
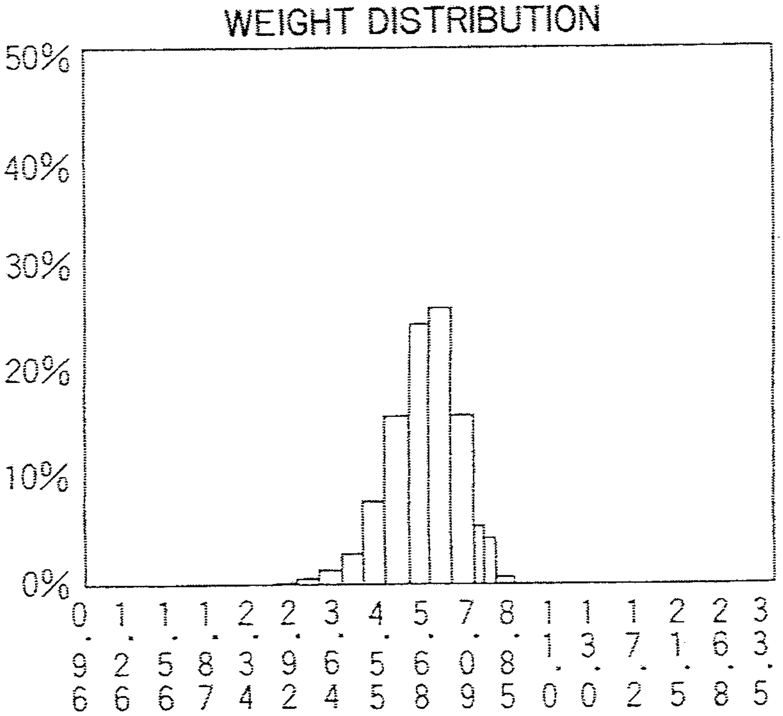
FIG. 2 and FIG. 3 show weight and number grain size distributions, respectively, for the toner granules of FIG. 1.
Figure 3:
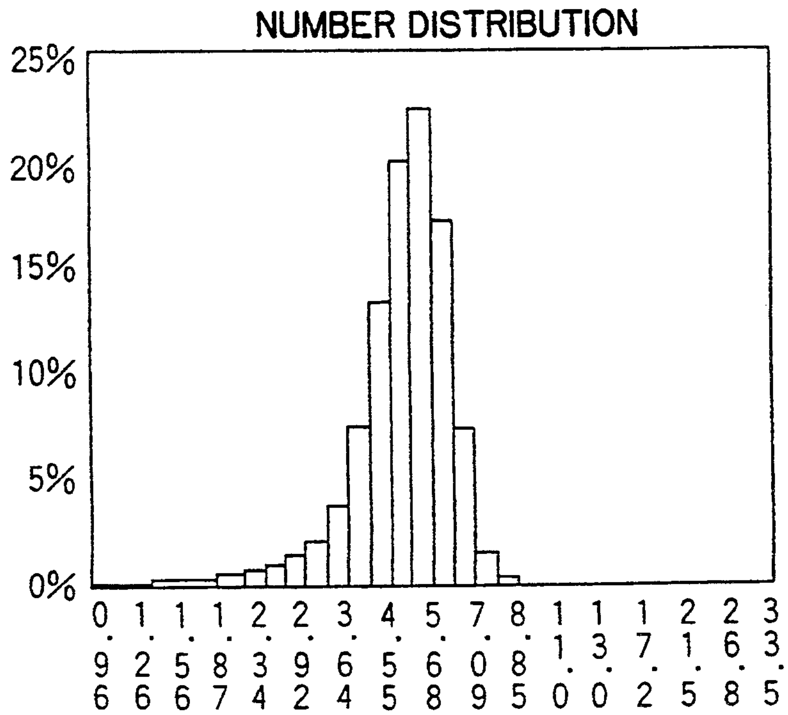

The grain diameter of the thus obtained black toner granules was 5.2 μm, the variation coefficient was 17.5% and, no sorting operation was necessary, when it was used as toner. The toner granules are shown in FIG. 1 as an election micrograph. The grain size distribution of the granules was measured by a Coulter Multisizer and the results are shown in FIG. 2 for weight distribution and FIG. 3 for number distribution.

After mixing 3 g of silica granule R-7920 into 100 g of such toner, it was mixed with a silicon-coated ferrite carrier and image evaluation was conducted by a U-Bix 3142 and it was found that a clear image free from offsetting or fog was obtained and fixing was satisfactory.

*EXAMPLE 1 of Tokukaikei 10201676 is reproduced below.

EXAMPLE 1

Into 100 parts by weight of a monomer mixture of styrene and n-butyl acrylate in an amount ratio of 80:20 (styrene:n-butyl acrylate), 50 parts by weight of polypropylene grafted resin having a weight average molecular weight of 70,000 which obtained by grafting 20 parts by weight of polypropylene (Mw=8,600) to 100 parts of a copolymer of styrene and n-butyl acrylate (80:20 weight ratio) and 50 parts by weight of a styrene resin (commercially available from Hercules Co. as Picolastic D 150) were dissolved to obtain a resin varnish (A). According to the following ingredients, a colorant and an additive were preliminary

| Ingredients | parts by weight |
|---|---|
| Resin varnish (A) | 93.8 |
| Carbon black*1 | 4.4 |
| Minus charge controlling agent*2 | 1.8 |

*1Available from Cabot Co. as Monerk.
*2Available from Orient Chemical Ind. Inc. as Bontron S-40.

Then, 100 parts by weight of the resulting solution was mixed with 1.0 parts by weight of α,α'-azobisisobutylonirile to obtain a mixture.

Next, 100 parts by weight of the resulting mixture and 150 parts by weight of a 5 wt % polyvinyl alcohol aqueous solution (available from Nippon Synthetic Chemical Co. as Gohsenol GH-17) were poured in a mixer (available from Sanei Seisakusho Co.) and mixed therein at 150 r.p.m. for 20 minutes to obtain a dispersed suspension.

A reaction vessel, equipped with a stirrer, a thermometer, a condenser, a heating apparatus and a nitrogen gas inlet, was charged with 250 parts by weight of the resulting suspension, to which 500 parts by weight of ion exchanged water was added under mixing. After completion of the addition, it was heated to 85° C. in a nitrogen blanket, and kept at the same temperature for 5 hours to conduct polymerization.

Thereafter it was subjected to filtration to separate color polymer particles from the polyvinyl alcohol aqueous solution, and the polymer particles were rinsed several times with warm water at 35° to 45° C. and the dried. The resulting particles were subjected to an air classifier into 5 to 10 μ to obtain a toner (A).

COMPARATIVE EXAMPLES

Comparative Example 1

Resin granules were obtained in the same manner as in Example 1 except that methyl cellulose was not used. The grain diameter of thus obtained granules was 2.1 μm and, although the granules contained those with an irregular shape, most of the granules maintained the grain diameter of the primary oil drops in the initial period and grain size distribution was wide.

Comparative Example 2

The rotation frequency of the homogenizer was set at 4000 rpm and the resin granules were obtained in the same manner as Example 3, except that the temperature was not raised. The grain diameter of thus obtained granules was 5.7 μm, the variation coefficient was 41% indicating an extremely wide grain size distribution, and a sorting operation was necessary in order to use them as toner.

Comparative Example 3

An attempt was made to obtain a black toner in the same manner as in Example 7 except that aqueous solution of polymer prepared by mixing the compositions shown in Table 3 was not used. From the time when the temperature was raised to 80° C., agglomerated substances started to stick to the agitation device and reactor vessel and the granules obtained after completion of reaction were large and coarse agglomerates.

| Components | Amount of mixing (g) |
|---|---|
| Gohsenol KL-05 | 15 |
| Hydroxypropyl cellulose | 150 |
| Ion Exchange water | 1350 |

It is clear from the above, that there is provided herein a method which makes it possible to produce spherical resin granules with a narrow grain size distribution by adjusting the grain diameter of oil drops contained in the suspension liquid utilizing the cloud points of at least more than 2 kinds of water-soluble polymers.

We claim:

1. A method of manufacturing resin granules with a grain diameter of 1 to 100 μm and a narrow grain size distribution of less than 30% variation coefficient, comprising mixing the following three components:

(a) either a polyvinyl alcohol having a saponification degree of 60 to 85% and a cloud point of 30° to 90° C., or a polyvinyl alcohol solution obtained by adding an electrolyte salt to polyvinyl alcohol having a saponification degree of more than 85% to adjust the cloud point within 30° to 90° C. or a mixture thereof, (b) an aqueous solution comprising at least one kind of a water soluble polymer having a cloud point of 30° to 90° C., selected from the group consisting of methyl cellulose, hydroxypropyl cellulose, polyethylene glycol alkyl ether and a block copolymer of polyethylene glycol-polypropylene glycol, and (c) a granule forming component containing a polymerizing monomer, at a temperature below the cloud point of the polyvinyl alcohol and water soluble polymer, thus obtaining fine primary granules of less than 10 μm, heating the granules to a temperature above the cloud point to obtain substantially spherical granules with a grain diameter increased about 2 to 20 times, and then polymerizing the polymerizing monomer during heating or after formation of granules.

2. The method according to claim 1 wherein the weight ratio of polyvinyl alcohol and water soluble polymer is within the range of 99.5/0.5 to 10/90.

3. The method according to claim 1 wherein the step of mixing is carried out by first mixing the components (a) and (c) at a temperature below the cloud point, and then mixing component (b) therewith.

4. A method of manufacturing resin granules with a grain diameter of 1 to 100 μm and a narrow grain size distribution of less than 30% variation coefficient, comprising mixing the following three components:

(a) either a polyvinyl alcohol having a saponification degree of 60 to 85% and a cloud point of 30° to 90° C., or a polyvinyl alcohol solution obtained by adding an electrolyte salt to polyvinyl alcohol having a saponification degree of more than 85% to adjust the cloud point within 30° to 90° C., or a mixture thereof, (b) an aqueous solution comprising at least one kind of water soluble polymer having a cloud point of 30° to 90° C. selected from the group consisting of methyl cellulose, hydroxypropyl cellulose, polyethylene glycol alkyl ether and a block copolymer of polyethylene glycol-polypropylene glycol, and (c) a granule forming component containing an isocyanate component, at a temperature below the cloud point of the polyvinyl alcohol and water soluble polymer, thus obtaining fine primary granules of less than 10 μm.

heating the granules to a temperature above the cloud point to obtain substantially spherical granules with a grain diameter increased to about 2 to 20 times, and then cooling below the cloud point and adding thereto a water-solution of an amino compound to perform interfacial polymerization.

5. The method according to claim 4 wherein the weight ratio of polyvinyl alcohol and water soluble polymer is within the range of 99.5/0.5 to 10/90.

6. The method according to claim 4 wherein the step of mixing is carried out by first mixing the components (a) and (c) at a temperature below the cloud point and then mixing component (b) therewith.

7. The method according to claim 1 wherein the mixture of components (a) to (c) are diluted with ion exchange water to form an oil-water suspension in which oily substances are present in the diluted mixture in an amount of 10∼40 wt.%.

8. The method according to claim 4 wherein the mixture of components (a) to (c) are diluted with ion exchange water to form an oil-water suspension in which the oily substances are present in the diluted mixture in an amount of 10∼40 wt.%.

* * * * *